United States Patent [19]

Malkamaki et al.

[11] Patent Number: 5,479,444
[45] Date of Patent: Dec. 26, 1995

[54] TRAINING SEQUENCE IN DIGITAL CELLULAR RADIO TELEPHONE SYSTEM

[75] Inventors: Esa Malkamaki; Pekka Ranta, both of Espoo, Finland

[73] Assignee: Nokia Mobile Phones Ltd., Salo, Finland

[21] Appl. No.: 201,343

[22] Filed: Feb. 24, 1994

[30] Foreign Application Priority Data

Mar. 9, 1993 [FI] Finland .................................. 931044

[51] Int. Cl.$^6$ .............................. H03H 7/30; H03K 5/159
[52] U.S. Cl. ............................... 375/231; 370/82
[58] Field of Search ........................ 375/231, 224; 370/79, 82, 83, 110.1; 455/52.1, 52.3, 67.6, 70

[56] References Cited

U.S. PATENT DOCUMENTS

| | | | |
|---|---|---|---|
| 4,672,630 | 6/1987 | Kaku | 375/13 |
| 5,212,689 | 5/1993 | Eriksson | 455/52.1 |
| 5,303,226 | 4/1994 | Okanoue et al. | 375/231 |

FOREIGN PATENT DOCUMENTS

| | | |
|---|---|---|
| 0332302 | 9/1989 | European Pat. Off. |
| 0446523A3 | 9/1991 | European Pat. Off. |
| 4201439A1 | 7/1993 | Germany |

OTHER PUBLICATIONS

IEEE Transactions on Vehicular Technology, vol. 40, No. 2, May 1991, New York, U.S., pp. 392–402, "Fast Adaptive Equalizers For Narrow-Band TDMA Mobile Radio" D'Aria et al.

Proceedings of 41st IEEE Vehicular Technology Conference, May 1991, St. Louis, U.S., "Adaptive Equalizer For Digital Cellular Radio" Nakai et al.

Finnish Office Action dated 15 Nov. 1993 and English Translation thereof.

*Primary Examiner*—Edward L. Coles, Sr.
*Assistant Examiner*—Jerome Grant, II
*Attorney, Agent, or Firm*—Perman & Green

[57] ABSTRACT

In radio phone systems with a digital cellular design currently used a training sequence of constant length, consisting of an guard part and a reference part, is included in a transmission burst between a base station and a mobile station. With the aid of a received training sequence, the receiver calculates the impulse response of the channel and is thereafter adapted into the channel. The quality of the connection can, according to the invention, be enhanced in that the training sequence is made adaptive, whereby the lengths of the guard part and the reference part may vary while the total length of the training sequence remains the same. According to another embodiment, also the total length of the training sequence is changed.

20 Claims, 2 Drawing Sheets

NORMAL BURST

NORMAL BURST

TRAINING SEQUENCE                BITS OF TRAINING SEQUENCE

| CODE | GUARD PART | REFERENCE PART | GUARD PART |
|------|------------|----------------|------------|
| 0 | 0.0.1.0.0. | 1.0.1.1.1.0.0.0.0.1.0.0.0.1.0.0. | 1.0.1.1.1. |
| 1 | 0.0.1.0.1. | 1.0.1.1.1.0.1.1.1.0.0.0.1.0.1.1. | 1.0.1.1.1. |
| 2 | 0.1.0.0.0. | 0.1.1.1.0.1.1.1.0.1.0.0.1.0.0.0. | 0.1.1.1.0. |
| 3 | 0.1.0.0.0. | 1.1.1.1.0.1.1.1.0.0.0.1.0.0.0.0. | 1.1.1.1.0. |
| 4 | 0.0.0.1.1. | 1.0.1.0.1.1.0.0.1.0.0.0.0.0.1.1. | 1.0.1.0.1. |
| 5 | 0.1.0.0.1. | 1.1.1.0.1.0.1.1.1.0.0.0.0.1.0.0. | 1.1.1.0.1. |
| 6 | 1.0.1.0.0. | 1.1.1.1.0.0.0.1.0.1.0.0.1.1.1.1. | 1.1.1.1.0. |
| 7 | 1.1.1.0.1. | 1.1.1.0.0.0.1.0.0.1.0.1.1.1.0.1. | 1.1.1.0.0. |

FIG. 4
PRIOR ART

| EXEMPLARY SEQUENCE | RESPECTIVE ADAPTIVE SEQUENCE |
|---|---|
| 5+16+5<br>10111 0010 0000 1101 0111 00100 | 3+20+3<br>001 0001 0111 1001 1010 001 000 |
| 7+16<br>1010111 0010 0000 1101 0111 | 3+20<br>001 0001 0111 1001 1010 0001 |
| 20+9<br>0001 0111 1001 1010 0001 000101111 | 24+5<br>0110 1000 0001 1001 0101 1110 01101 |
| 20+9<br>0001 0111 1001 1010 0001 000101111 | 28+1<br>0011 0101 1111 0001 0010 1000 00110 |

FIG. 5

TRAINING SEQUENCE IN DIGITAL CELLULAR RADIO TELEPHONE SYSTEM

FIELD OF THE INVENTION

The present invention relates to a digital cellular radio telephone system provided with at least one base station and a plurality of subscriber apparatus, and in which in a radio channel between the base station and a subscriber apparatus a training sequence is transmitted in a transmission burst, according to which the receiver fits the channel equalizer into the radio channel.

BACKGROUND OF THE INVENTION

Many information transmission problems in the radio phone system involve time-variant or statistical sources of signal degradation in a radio channel. An advantage of the digital radio telephone system compared with the analog one is that it can be designed to monitor the channel and be adapted to the changes thereof. Any transmission channel, be it a transmission line or a radio channel, affects the amplitude of the waveform, frequency or phase of the signal, thus producing intersymbol inteference among the bit pulses. In a mobile station, like a radio phone in a car, the characteristics of the channel change constantly over time. A general solution in digital cellular systems known in the art is to use adaptive channel correction. This means that certain distortion characteristics of a channel are measured periodically or continuously, and the predicted distortions in the transmitted pulses are subtracted from the received waveform. The system is capable of monitoring the quality of the channel by measuring the bit error ratio and/or other parameters, such as signal strength and delays.

The subscriber device of the cellular system may mean, depending on the system, a so-called mobile station, i.e. mobile communicating equipment, between the antenna and the base station whereof being provided a radio channel, or it may refer to a phone which is by means of a wire connection connected with a transmitter/receiver at a remote distance, between the antenna whereof and the antenna of the base station being provided a radio channel. Reference is made below primarily to a mobile communicating equipment, though it is useful to note that the same features are applicable to the subscriber device of the latter definition as well. The signal strength and the delay are bound to the signal propagation distance between the base station and the mobile station. As is well known in the art, the transmission rate is high because of the TDMA-transmission used in digital systems so that the multiple-path propagation characteristic of the radio path is visible in the reception not only in the form of rapid so-called Rayleigh fading of the envelope of the RF signal but also as an intersymbol interference between the detected bits. In view of the intersymbol interference, the signal propagation model has been so expanded in the digital systems that a received signal is no longer an individual Rayleigh-faded signal but a sum of independently Rayleigh-fading signals and signals including a different delay.

The impulse response of a radio channel can be illustrated in the time domain by means of tap presentation as shown in FIG. 1. Therein, the height of an individual tap illustrates the average strength of a Rayleigh-faded signal and the location of the tap illustrates the transmission delay. The distribution of the taps is dependent on the power levels used and the environment conditions, and the fading frequency of the taps is dependent on the speed of the mobile station, e.g. of a car. In various systems, some of such propagation models have been defined in order to illustrate various environments and vehicle velocities.

On the basis of what is said in the foregoing it is obvious that since the radio channel changes rapidly, the intersymbol interference of the detected bits caused by signal transmission across the radio channel must be corrected by measuring the impulse response of the channel and by adapting the receiver to the tap configuration of the channel. This is usually carried out in the systems so that the base station or the mobile communicating equipment transmits a known bit configuration in the transmission burst thereof, i.e. a constant-length sequence of consecutive bits. The sequence is called a training sequence. The receiver has earlier received an encoded piece of information about what kind of bit pattern, that is training sequence, will be transmitted. The receiver correlates with the prior art training sequence corresponding to the training sequence it received and equivalent to the encoded data accessed from the memory. As a result of the correlation, an estimate on the radio path (i.e. delay) is received and the receiver sets the channel equalizer so that the delay distributions are corrected on a given length. For instance, in the GSM system the delay distributions are corrected up to 16 µs.

One TDMA frame, for instance in the GSM system, comprises eight time intervals. The signal is transmitted in the form of bursts, of which a so-called standard burst is shown in FIG. 2. It consists of first three tail bits, whereafter 58 data bits follow, said bits containing data or speech. They are followed by a training sequence of length of 26 bits, then again followed by 58 data bits, and finally, by three tail bits. Between the time intervals of the frame a 8.25 sec a guard period is provided. As shown in the figure, the training sequence is located in the middle of a burst as a uniform sequence, its constant length being 26 bits. Eight training sequences differing in bit configuration are provided, and pre-information has been transmitted to the phone about the type of training sequence to be transmitted by the base station.

The training sequence need not be located in the middle of a burst. Therefore, in a digital radio phone system used in the U.S.A. a frame consists of six time intervals, each containing 162 symbols. One symbol may comprise 2 bits, as in the QPSK modulation used in said system, or even more bits, depending on the modulation system. In a burst to be transmitted from a base station to a mobile station, a transmission time interval always contains first a 14 symbol synchronization burst used as a training sequence. Let it be noted that the length of a training sequence is constant. In said system six different sequences of training sequences are provided.

Let it be noted that the training sequence is transmitted both from the subscriber device to a base station (Up Link) and from the base station to the subscriber device (Down Link). The symbol sequences of the training sequences need not necessarily be the same in both directions. Whatever the system, endeavours are made to provide such sequences of training sequences that they are provided with as good autocorrelation properties as possible, i.e. on both sides of a peak in the middle of an autocorrelation function a sufficient amount of zeroes are provided. A given training sequence is appropriate for a given environment. For instance in city areas the multiple path propagation of a signal is dominating, and the training sequence can be therefore different from that in the countryside where few obstacles causing signal reflections exist. In systems currently used the length of a training sequence is the constant length typical of the system and it has been selected according to the so-called worst case, whereby it is necessary to be prepared to correct the delay distortion time-wise on a long distance and it is assumed that the impulse response of the channel is multiple-tap type.

FIG. 3 shows the design of a typical training sequence. The example is selected from the GSM system. The training sequence comprises a reference part, on both sides whereof being an additional part. The length of the reference part is 16 bits, and the length of each guard part is 5 bits. The shape of a training sequence ie thus 5+16+5. FIG. 4 presents the bit sequences included in the training sequences used. As mentioned above, the sequences have been so selected that they are provided with good autocorrelation properties. The length of the guard part determines how long impulse response in said training sequence is estimatable. In the present training sequence a six-tap impulse response can be estimated. The length of the additional part in GSM has been selected to conform to the worst instance, i.e. training sequences similar in configuration are used all over the network, although not all six taps need to be estimated: if the delay distribution is small, as it is in the countryside, estimation of only a few taps would be enough.

The guard part need not be located on both sides of the reference part, such as in the GSM system, instead, it can be only one guard part which is located before or after the reference part. In practice, the guard part is so produced that the first and/or last symbols are selected for the symbols thereof.

The length of the additional parts of the training sequence and the reference part has an essential significance: the longer the reference part (the more bits or symbols), the better channel estimate is obtained because when using a long reference part the noise becomes averaged, thus not distorting the result. On the other hand, the longer is the guard part (as symbols or bits), the longer bit distributions can be measured. Now, reservations have been made e.g. in the GSM system against the most difficult instance by setting 5 bits for the length of the additional part, whereby a six-tap impulse response can be estimated.

Setting the reference part and the guard part fixed in length involves certain drawbacks. If the multipath propagation is insignificant, i.e. the impulse response of the channel is short in duration, it is of no use to utilize a long additional part, and instead, a long reference part would be preferred, whereby a better estimate of the radio channel than today could be obtained. Thus, in areas where no obstacles exist to a disturbing degree, a good quality of the connection could be provided also in long distances. On the other hand, in areas where the multiple-path propagation is dominant, it would be better to use as long as additional part as possible, whereby a multiple-tap impulse response would be provided and a channel equalizer can be disposed to correct the delay distribution time-wise on a great distance. In favourable conditions the length of the entire training sequence need not be very long. Now, capacity would be released in the burst to transfer more speech and data information.

SUMMARY OF THE INVENTION

As taught by the invention, the drawbacks mentioned above can be avoided by utilizing in the cellular system the training sequence which is defined in the accompanying claims.

BRIEF DESCRIPTION OF THE DRAWINGS

The features of this invention are made more apparent in the ensuing Detailed Description of the Invention when read in conjunction with the attached drawings, wherein:

FIG. 4. illustrates bit sequences of a training sequence in the conventional GSM system; and FIG. 5 illustrates several examples of adaptive sequences in accordance with the teaching of this invention.

DETAILED DESCRIPTION OF THE INVENTION

Figure 1:
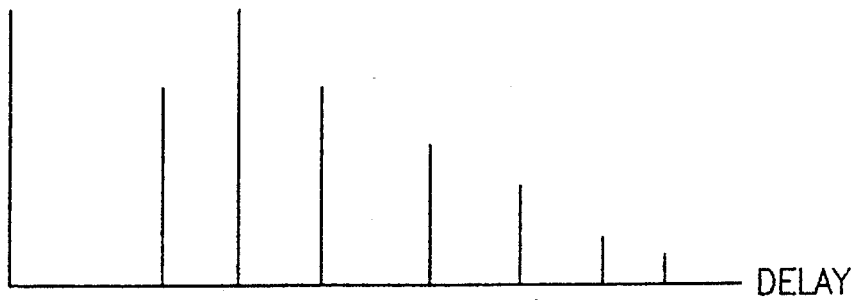
FIG. 1 illustrates the impulse response of a received radio channel in the time domain, in a so-called conventional tap-type presentation.
Figure 2:
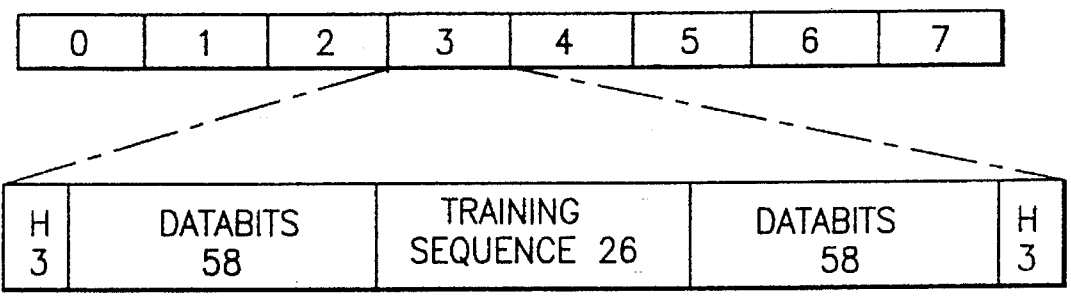
FIG. 2 depicts a conventional standard burst in the GSM system.
Figure 3:
FIG. 3 illustrates one typical and conventional structure of a training sequence.

The invention is based on the aspect that since the delay distribution of a channel varies significantly from location to location, it is useful to make the training sequence adaptive. It can be embodied at least in two ways.

According to a first embodiment, the training sequence can be of a fixed length while the lengths of the guard part and the reference part vary from situation to situation. Hereby, when the impulse response of a channel is short, so that the guard part required is also short, or, along with the deteriorating signal—noise ratio of the channel, the reference part can be lengthened at the cost of the additional part, whereby a better estimate about the radio channel can be made. Respectively, if the impulse response of the channel in the area of a cell is long or if it becomes longer, the guard part is lengthened at the cost of the reference part. An advantage of a training sequence of a fixed length is that the burst remains constant in length and shape. Let us assume that the length of a training sequence is the constant 30 symbols. A sequence could be of form 7+16+7 (i.e. guard part+reference part+additional part) when the impulse response of the channel is long. With such configuration, not more than eight taps can be estimated. When the impulse response of the channel is shorter, the training sequence could be 5+20+5 or 3+24+3, or even 1+28+1 in form, depending on the number of bits required. In the table of FIG. 5 more examples are presented on adaptive sequences. The "exemplary sequence" on the left in the table is used e.g. when the impulse response is long, and the "adaptive" sequence can be transmitted when the impulse response is short, so that the length of the reference part can be increased at the cost of the additional part, and a better estimate on the channel can be provided. The binary sequences presented here are merely exemplary in character. According to the second embodiment, the total length of a training sequence is not constant but varies. Now, in situations in which the impulse response ie short or it becomes shorter, and a good channel estimate with a short guard part can be produced, the guard part can be reduced while the reference part remains the same in length. The length of a training sequence becomes shorter, thus, the symbols thereof can be transferred into other use, for instance for speech/data transfer of the user, or for transferring of signalling data. Similarly, in adverse situations in which the impulse response of the channel is very long or it becomes longer, the training sequence can be lengthened by lengthening the additional part, whereby by means of the long additional part, the long delay distribution can be taken into consideration. If no essential changes occur in the impulse response of the channel, the signal/noise ratio of the channel gets worse, the length of the reference part ie increased so that a better estimate on the channel can be made and the signal/noise ratio is enhanced. Respectively, together with the improved signal/noise ratio, the reference part can be shortened. In said two last-mentioned instances, the length of the guard part will not be changed, but along with the changing length of the reference part the total length of the training sequence changes.

The variation of the total length of the training sequence according to said second embodiment can be implemented in the systems known in the art, e.g. by varying the length of the time interval in which the training sequence ie transmitted, whereby an increase in the length of the training sequence is not carried out at the cost of the rest of symbols of the transmission burst. A second embodiment is such that the training sequence can be extended to the range reserved for the speech/data symbols of the data field, provided there is room for them at that moment. Also the modulation system utilized has an influence on how many bits can be transmitted in a given number of symbols; therefore, when the modulation method is changed, also the number of the bits available for a training sequence is also affected.

Both of the embodiments also include such a possibility that the training sequence can be transmitted only every now and then, not in each frame. Hereby, instead of transmitting the symbols of a training sequence, user information (speech/data) or system data can be transmitted. The second embodiment makes the possibility feasible that the training sequence can be reduced to zero, whereby it will not be transmitted.

Various ways for transmitting an adaptive training sequence can be adopted. First, the operator can measure the environment of the cell and define what kind of training sequence is most appropriate and use it. When a connection is produced between a base station and a mobile station, the base station transmits information, by using e.g. some method known in the art, about which type of training sequence is in use for said training sequence. The training sequence information may also not be transmitted, whereby the mobile station tests what kind of training sequence is most appropriate for the received training sequence, and makes a decision of using it. The same training sequence is in use in the cell area. Secondly, a connection-specific training sequence can be used. It can be implemented so that right at the beginning of a connection a long training sequence is used (according to the worst instance). Thereafter, the base station changes the training sequence by changing the length of the reference part, the length of the additional part, the total length of the training sequence, or a combination thereof. Information about a change of the training sequence is transmitted to the mobile station. Thus, the base station selects the best training sequence available for said connection, and from that moment onwards, the most appropriate training sequence is used. In practice, such method may, for instance, be adopted that an appropriate length of the guard part is concluded e.g. on the basis of the impulse response of the channel measured by the subscriber device. When the training sequence is transmitted from a base station to a subscriber device, the subscriber device measures the impulse response of the channel. If it finds out that the guard part is unneccessarily long or too short, it informs the base station thereof, whereby the training sequence is equally changed.

The aim of the adaptive training sequence described above is to provide as good channel estimate as possible for the radio link to be used, but the invention may equally be used for achieving a good synchronization, because if the mobile station is adapted as well as possible into the channel, also a good synchronization is achieved, in addition to a correction of the delay distribution and the correct channel estimation.

We claim:

1. A digital cellular system, comprising at least one base station for communication with subscriber equipment, and in which between a base station that includes a transmitter and a receiver and a subscriber equipment that also includes a transmitter and a receiver a radio channel can be established for the transmission of a transmission burst by at least one of said base station and said subscriber equipment, in which radio channel a training sequence having a recognizable symbol sequence is included in a transmission burst transmitted by said at least one of said base station and said subscriber equipment, said recognizable symbol sequence comprising a plurality of symbols for expressing a reference part and at least one additional part, whereby a receiver of at least one of said base station and said subscriber equipment can adapt itself to the radio channel according to an impulse response measured in the radio channel in accordance with the received training sequence, characterized in that the at least one of said reference part and said other part of said recognizable symbol sequence are not comprised, for all transmission bursts, of a constant number of said plurality of symbols.

2. A digital cellular system according to claim 1, characterized in that in the system a total number of symbols that comprise the training sequence is constant.

3. A digital cellular system according to claim 2, characterized in that when it is determined that an impulse response of the radio channel is long, the number of symbols that comprise the other part is increased and the number of symbols that comprise the reference part is decreased.

4. A digital cellular system according to claim 2, characterized in that when it is determined that at least one of an impulse response of the radio channel is short and a signal/noise ratio of the radio channel has decreased, the number of symbols that comprise the reference part is increased and the number of symbols that comprise the other part is decreased.

5. A digital cellular system according to claim 1, characterized in that a total number of symbols that comprise the training sequence is not constant.

6. A digital cellular system according to claim 5, characterized in that a total number of symbols that comprise the training sequence is increased by increasing a number of symbols that comprise said other part when it is determined that an impulse response of the radio channel has increased.

7. A digital cellular system according to claim 5, characterized in that a total number of symbols that comprise the training sequence is increased by increasing a number of symbols that comprise said reference part when it is determined that a signal/noise ratio of the radio channel has decreased.

8. A digital cellular system according to claim 5, characterized in that a total number of bits that comprise said training sequence is decreased by decreasing a number of bits that comprise said reference part when a signal/noise ratio of the radio channel is determined to have increased, whereby in a connection between the base station and the subscriber equipment a total number of information bits of a transmission burst may be increased by an amount equal to the number of bits by which said reference part is decreased.

9. A digital cellular system according to claim 5, characterized in that a total number of bits that comprise said training sequence is decreased by decreasing a number of bits that comprise said other part when an impulse response of the radio channel is determined to have decreased, whereby in a connection between the base station and the subscriber equipment a total number of information bits may be increased by an amount equal to the number of bits by which said other part is decreased.

10. A digital cellular system according to claim 9, characterized in that if a number of bits of said training sequence are decreased to zero, said training sequence is not transmitted.

11. A digital cellular system according to claim 1, characterized in that in a cell that is associated with a base station additional parts of all training sequences are mutually of the same length in each radio channel between the base station and subscriber equipments, and respectively, reference parts are also of equal length.

12. A digital cellular system according to claim 1, characterized in that both a number of bits that comprise said other part and a number of bits that comprise said reference part are determined on a connection basis.

13. A digital cellular system according to claim 1, characterized in that the training sequence is transmitted less frequently than in each transmission burst.

14. A method for operating a digital cellular system of a type that includes a base station in bidirectional wireless communications with a user terminal through a communications channel, comprising the steps of:

transmitting a burst of data by at least one of the base station and the user terminal between the base station and the user terminal, the burst including an information data portion and a training data portion, the training data portion being used to compensate a receiver of the burst for an impairment in the communications channel;

wherein the training data portion includes at least a first sequence of bits and at least one second sequence of bits; and wherein the step of transmitting includes a step of adaptively varying at least one of a number of bits of the first bit sequence and a number of bits of the at least one second bit sequence in accordance with a degree of impairment of the communications channel.

15. A method as set forth in claim 14 wherein the first sequence of bits represents a reference bit sequence and wherein the at least one second bit sequence represents a guard bit sequence.

16. A method as set forth in claim 14 wherein the step of adaptively varying maintains a total number of bits of the training data portion equal to a predetermined, constant value.

17. A method as set forth in claim 14 wherein the step of adaptively varying operates so as to vary a total number of bits of the training data portion.

18. A method for operating a digital cellular system of a type that includes a base station in bidirectional wireless communications with a user terminal through a communications channel, comprising the steps of:

transmitting a burst of data by at least one of the base station and the user terminal between the base station and the user terminal, the burst including an information data portion and a training data portion, the training data portion being used to compensate a receiver of the burst for an impairment in the communications channel;

wherein the training data portion includes at least a reference sequence of symbols and at least one guard sequence of symbols; and wherein the step of transmitting includes a step of adaptively varying at least one of a number of symbols of the reference symbol sequence and a number of symbols of the at least one guard symbol sequence in accordance with a degree of impairment of the communications channel.

19. A method as set forth in claim 18 wherein the step of adaptively varying operates so as to maintain a total number of symbols of the training data portion equal to a predetermined, constant value.

20. A method as set forth in claim 18 wherein the step of adaptively varying operates so as to increase or decrease a total number of symbols of the training data portion, and further comprising a step of proportionately decreasing or increasing a number of symbols of the information data portion.

* * * * *